INVENTOR.
J. HAROLD BUSHMAN
BY Lindsey, Prutzman and Hayes
ATTORNEYS

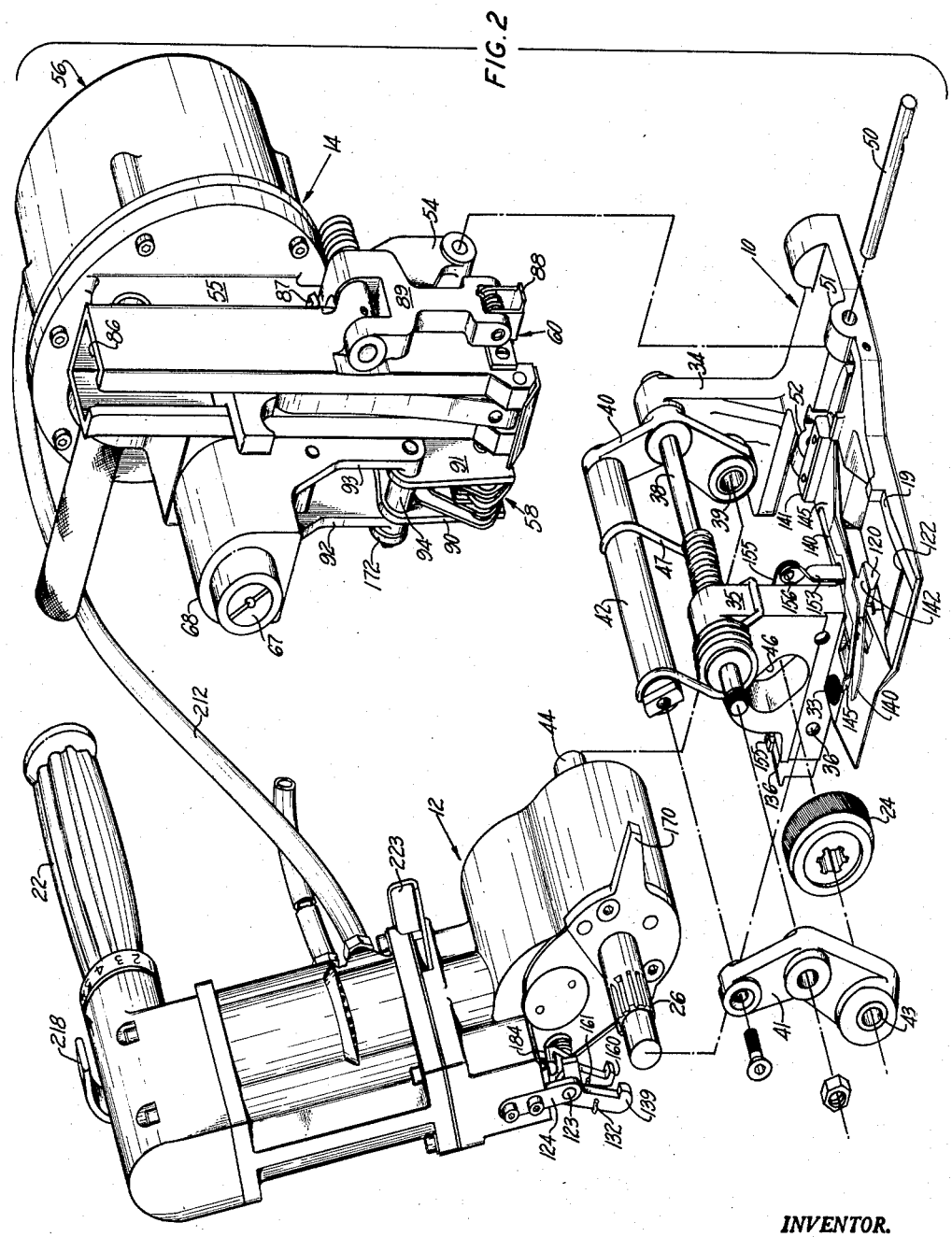

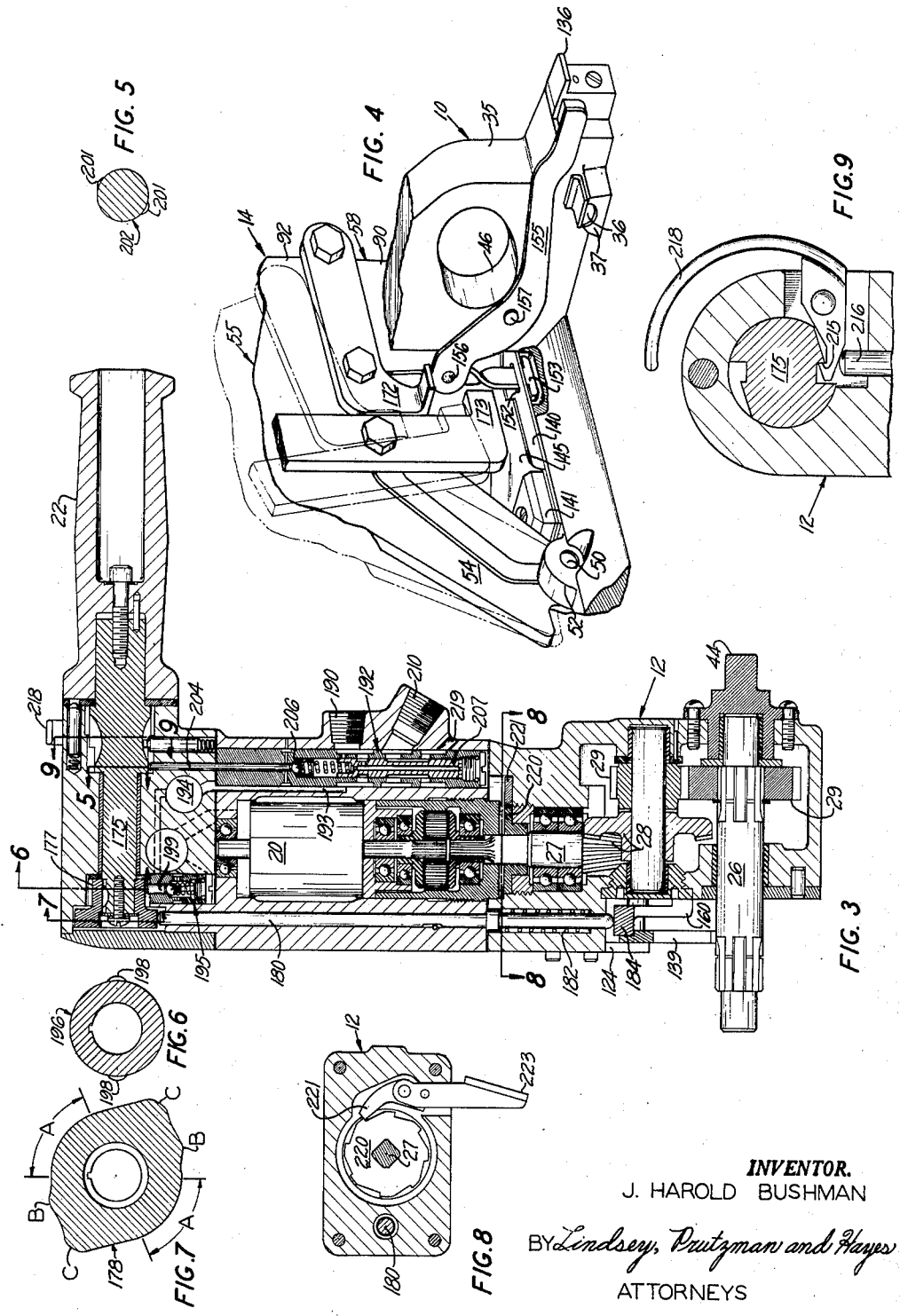

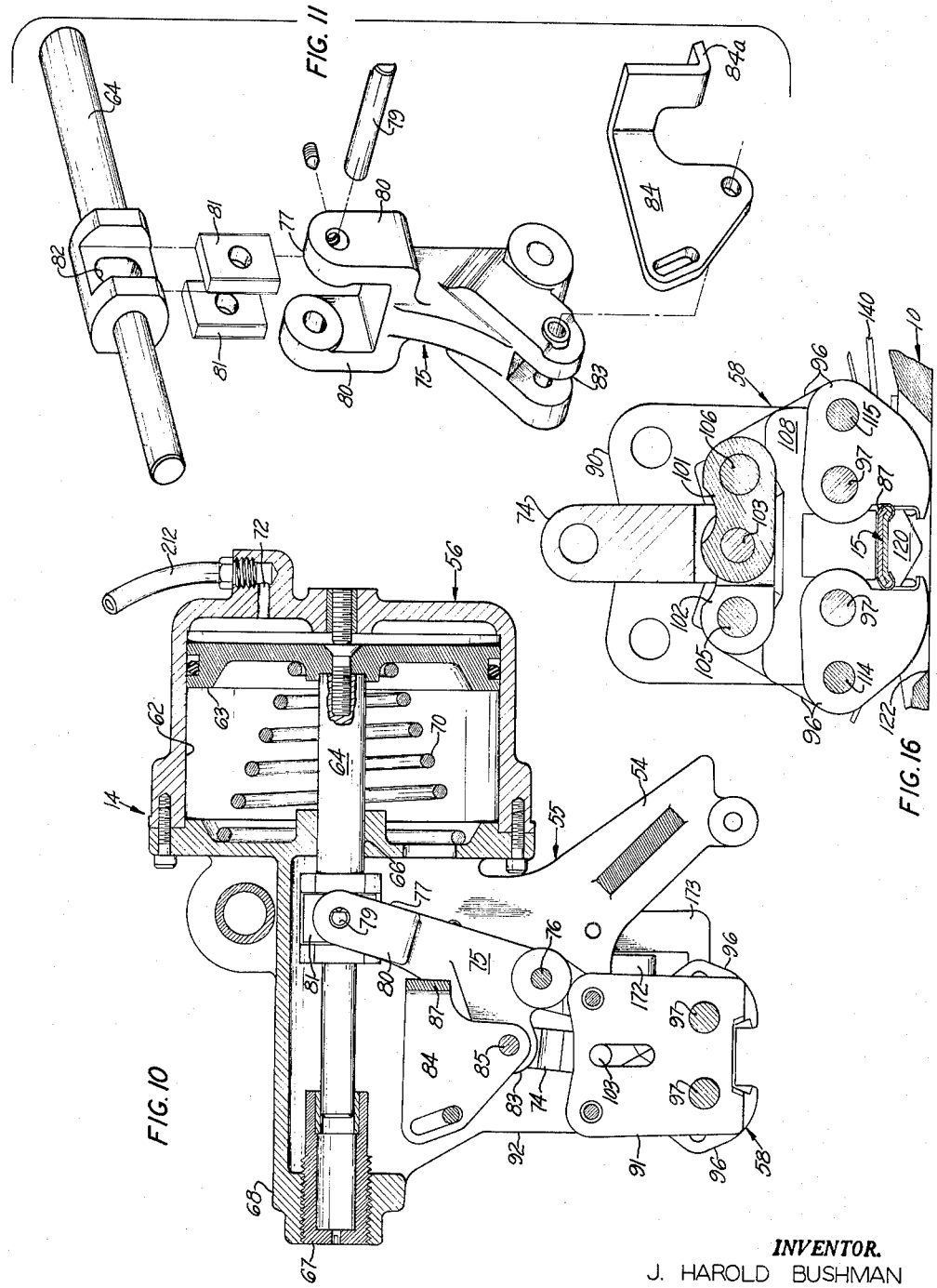

Oct. 12, 1965   J. H. BUSHMAN   3,211,186
STRAPPING TOOL
Filed July 18, 1962   5 Sheets-Sheet 5
FIG. 12
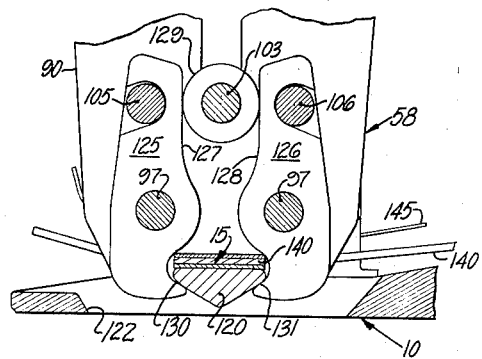
FIG. 13
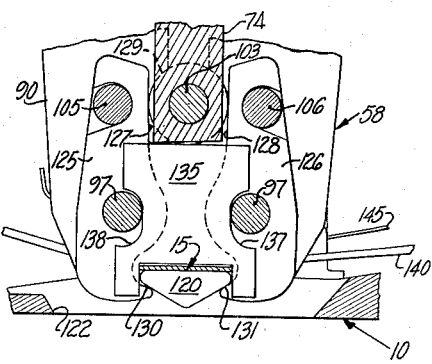
FIG. 14
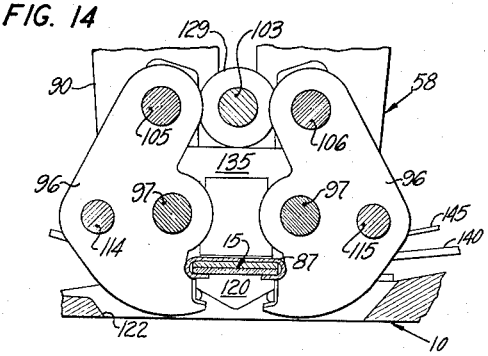
FIG. 15
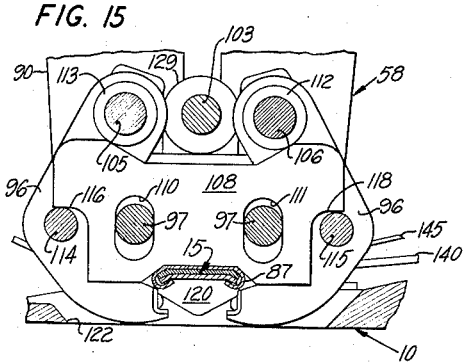
FIG. 17
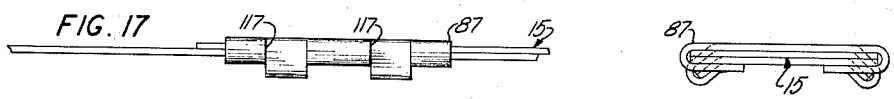
FIG. 18
FIG. 19
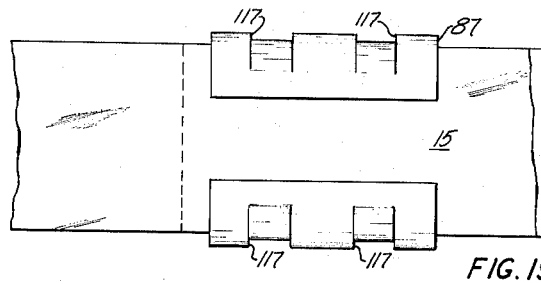
FIG. 20
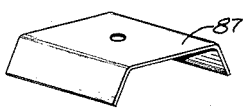
INVENTOR.
J. HAROLD BUSHMAN
BY Lindsey, Prutzman and Hayes
ATTORNEYS United States Patent Office 3,211,186
Patented Oct. 12, 1965

3,211,186
STRAPPING TOOL
Julius Harold Bushman, Plainville, Conn., assignor to The Stanley Works, New Britain, Conn., a corporation of Connecticut
Filed July 18, 1962, Ser. No. 210,700
15 Claims. (Cl. 140—93.4)

This invention generally relates to tools for use in applying strapping to an object or a package and is more particularly directed to the provision of an improved tool for tensioning a loop of strapping, joining the overlapped portions of the loop, and severing the supply end of the strapping from the loop.

It is a general object of this invention to provide an improved strapping tool requiring a minimum of operator skill to achieve proper strapping of a package or other object.

It is a primary object of this invention to provide an improved portable power-operated strapping tool having a single control thereby to permit the operator to utilize only one hand in achieving rapid tensioning of the loop, sealing of the overlapped portion, shearing of the supply end of the strapping, and stripping of the tool from the completed loop on the package.

It is a further object of this invention to provide an improved strapping tool having extreme durability as well as simplicity of construction so as to provide extended periods of operation with minimum repair or servicing.

It is an additional object of this invention to provide an improved tool for sealing the overlapped ends of a loop of strapping and severing the supply end from the sealed loop to form an extremely strong joint that has been accurately severed from the supply end of the strapping without weakening or otherwise damaging the strapping or the joint.

It is a still further object of this invention to provide an improved power-operated tool for tensioning a loop or strapping featuring extreme ease of operation from a single control station.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 2 is an exploded perspective view of the strapping of FIG. 1;

FIG. 3 is a longitudinal cross-section view of the auxiliary frame with motor drive unit;

FIG. 4 is a partial perspective view showing a portion of the details of the lower shear blade mounting, the sealing head mounting and the motor mounting with a portion of the sealing head shown in dotted lines in the raised position;

FIG. 5 is a cross-section view of the cam shaft taken along the line 5 of FIG. 3;

FIG. 6 is a cross-section view of the cam shaft taken generally along the line 6 of FIG. 3;

FIG. 7 is a cross-section view of the cam shaft taken generally along the line 7 of FIG. 3;

FIG. 8 is a cross-section view taken generally along the line 8—8 of FIG. 3;

FIG. 9 is a cross-section view taken generally along the line 9—9 of FIG. 3;

FIG. 10 is a side elevation view partially in cross-section of the sealing head of FIG. 1;

FIG. 11 is a partial exploded perspective view of the sealing head drive mechanism;

FIG. 12 is a partial cross-section view of the sealing and shearing mechanism taken generally along the line 12—12 of FIG. 1;

FIG. 13 is a partial cross-section view of the sealing and shearing mechanism taken generally along the line 13 of FIG. 1;

FIG. 14 is a partial cross-section view of the sealing and shearing mechanism taken generally along the line 14 of FIG. 1;

FIG. 15 is a partial cross-seciton view of the sealing and shearing mechanism taken generally along the line 15 of FIG. 1;

FIG. 16 is a partial cross-section view of the sealing and shearing mechanism taken generally along the line 16 of FIG. 1;

FIGS. 17, 18 and 19 are side, end and bottom views, respectively, of a joint achieved with the tool of this invention; and FIG. 20 is a perspective view of a seal suitable for use in achieving the joint shown in FIGS. 17–19.

Figure 1:
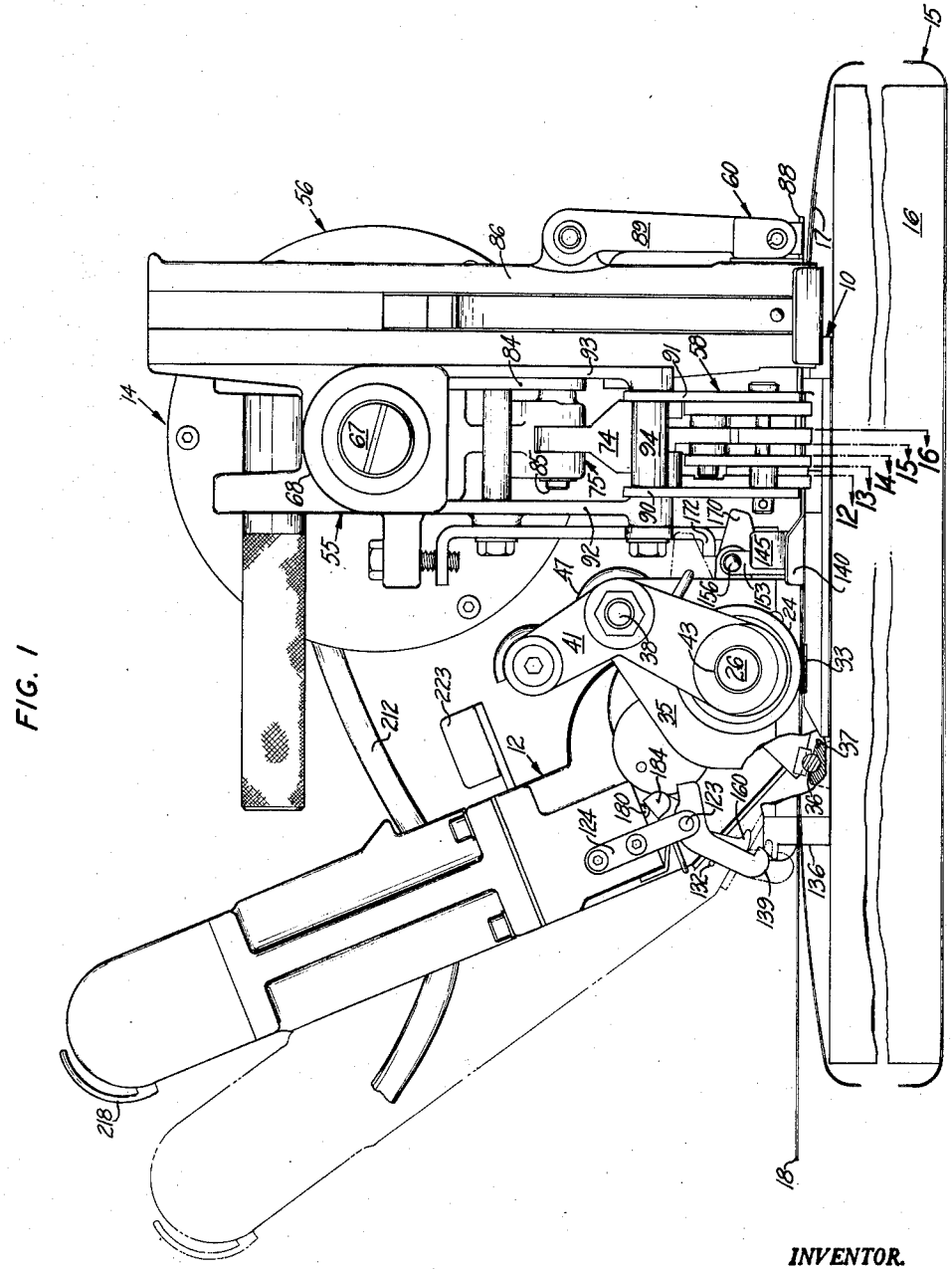
FIG. 1 is a side elevation view of a preferred embodiment of the strapping tool of this invention with portions of the tool shown in dotted lines to indicate the tool-loading and stripping position of the auxiliary frame and with a portion of the motor unit cut away to reveal the auxiliary frame pivot.

Turning first to FIGS. 1 and 2, it is seen that the illustrated preferred embodiment of the strapping tool of this invention comprises a base or main frame 10 on which is mounted an auxiliary frame generally designated 12 including the mechanism for tensioning the strapping and a sealing head generally designated 14 containing the mechanism for sealing the overlapping portion of the strap loop and severing the loop from the supply end of the strapping. The illustrated embodiment shows the tensioning mechanism and the sealing mechanism as pneumatic motor-driven devices, it being understood, of course, that many aspects of the present invention are applicable not only to other types of power-operated strapping tools, but also to manually operated tools as well. As seen in FIG. 1, the strapping tool is shown applying steel strapping 15 to a package schematically illustrated as 16, which strapping has a free end 17 and a supply end 18, the strapping passing over a portion of the main frame generally designated by the numeral 19 (as best seen in FIG. 2).

Auxiliary frame 12 (see particularly FIGS. 2 and 3) generally comprises an air motor 20, a control handle 22 and a tensioning wheel 24, which tensioning wheel is rotatably supported on axle 26 and driven from output shaft 27 of air motor 20 through a pair of hypoid gears 28 and a pair of pinions 29. Auxiliary frame 12 is mounted on and guided for pivotal movement relative to main frame 10 such that downward movement of the control handle 22 relative to the main frame causes raising of the tensioning wheel 24 relative to the serrated plug 33 adjustably positioned in frame 10. This pivotal mounting includes a pair of posts 34 and 35 formed integrally with the main frame 10 and a pivot pin 36 positioned adjacent the end of frame 10 on the inner side of post 35 and rotatably received within grooved shoulder 37, and a suitable aperture in frame 10. Pivot pin 36 is provided with a flattened upper surface which is engaged by the underside of auxiliary frame 12 (as best seen in FIG. 1). In order to guide the auxiliary frame for pivotal movement with pin 36 as well as to secure the auxiliary frame to the main frame, there is provided a rod 38 which is received in suitable apertures in posts 34 and 35 and a pair of generally L-shaped support members 40 and 41 which are rotatably supported on rod 38 and connected together by bar 42 secured to the end of the upper leg of each support member. Member 40 is apertured at 39 and rotatably receives projecting stud 44 which is secured to auxiliary frame 12 and forms a bearing for axle 26. Member 41 is apertured at 43 and supports the outer end of axle 26 which extends through an elongated slot 46 provided in upright 35. The spring 47, which is wrapped around shaft 38 and in engagement with spacer bar 42 and with support 35, acts to urge the auxiliary frame in a clockwise direction about the pivot 37 as viewed in FIG. 1, thereby to urge tensioning wheel 24 downwardly toward serrated plug 33. The auxiliary frame 12 is thus supported for pivotal movement such that downward movement on the control handle 22 which is positioned on one side of the pivot 37 will cause upward movement of the tensioning wheel 24 which is positioned on the other side of the pivot 37.

Cooperating with the tensioning unit and the main frame is a sealing head generally designated 14 which is pivotally mounted on frame 10 through the cooperation of pin 50 which extends between the apertured shoulders 51 and 52 on frame 10 and passes through apertures in supporting arms 54 on the frame 55 of sealing head 14. Pneumatic drive motor 56 is also supported on frame 55 and is connected to a sealing and shearing mechanism generally designated 58 including a seal-feeding mechanism generally designated 60.

As best seen in FIGS. 10 and 11, pneumatic motor 56 includes a cylinder 62 secured to frame 55 and containing a piston 63 connected to drive rod 64, rod 64 being guided by the side walls of bore 66 provided in frame 55 and a sleeve bearing 67 threadably received in the end of support arm 68 on frame 55. Coil spring 70 is positioned within cylinder 62 between frame 55 and piston 63 to urge the piston to the position shown in FIG. 10 so that air admitted under pressure through aperture 72 will drive the cylinder to the left as viewed in FIG. 10 thereby compressing the spring. The linear movement of rod 64 is transformed into downward movement of drive link 74 of the sealing and shearing mechanism 58 by arm 75 which is pivotally connected by pin 76 to the supporting frame 55. Bifurcated end 77 is pivotally connected to rod 64 by a pin 79 which extends between the arms 80 and through spacer blocks 81 and aperture 82. End 83 of arm 75 is also bifurcated and pivotally connected to drive link 74 and to lever 84 of the seal feed mechanism by pin 85.

Integrally formed as a part of frame 55 is a seal-feeding mechanism 60 including a magazine 86 containing a substantial number of seals 87 (see FIG. 20), one of which is advanced into position between the jaws of the sealing mechanism 58 in properly timed relation to the operation of the sealing mechanism by seal feed finger 88 pivotally connected to arm 89 which, in turn, is pivotally mounted on the side wall of magazine 86 and driven by arm 84a of lever 84 (best seen in FIG. 2). The seal storage and feed mechanism is of conventional design and any suitable mechanism can be used with the strapping tool of this invention.

As best seen in FIGS. 1, 2 and 12–16, the jaws and punches which deform the overlapped ends of the strapping are of conventional design such as is shown in Patent No. 2,680,979 and generally comprise a pair of side plates 90 and 91 secured to arms 92 and 93 of frame 55 and spaced apart by a pair of collars 94, one of which is shown in the drawings. A plurality of pairs of sealing or crimping jaws 96 are pivotally supported on pins 97 extending between plates 90 and 91 and are coupled to drive link 74 by arms 101 and 102 (see FIG. 16) by pivot pin 103 and pins 105 and 106 such that downward movement of drive link 74 from the position shown in FIG. 10 causes the pins 105 and 106 to move away from each other (as best shown in FIG. 16) thereby pivoting the jaws about pins 97 to wrap the seal 87 around the overlapped ends of the strap. For completeness, a punch 108 is illustrated in FIG. 15, which punch is slidably mounted between adjacent pairs of sealing jaws on pivot pins 97 with elongated apertures 110 and 111 permitting limited reciprocating motion, the upper surface of punch 108 being engaged by friction-reducing rollers 112 and 113 mounted on pins 105 and 106 to drive the punch downwardly as the pins 105 and 106 move outwardly thereby to partially sever and deform the seal as at 117. The punch is returned to its raised position by the engagement of pins 114, 115 with shoulders 116, 118, respectively.

A specific improvement provided by this invention includes the provision of a tongue 120 which extends into the generally rectangular recess or opening 122 (best seen in FIG. 2) which is positioned to cooperate with the aforementioned jaws of the sealing head. This specific improvement includes the provision of a pair of latching jaws 125, 126, which jaws are supported adjacent plate 90 for pivotal movement on the pins 97 and which are provided with contoured, generally wedge-shaped inner surfaces 127, 128 which cooperate with a roller 129 mounted on pin 103 such that downward movement of drive link 74 causes the lower hook ends 130, 131 to wrap around projection 120 and hold the entire sealing head assembly fixed relative to the main frame during the sealing and shearing operation. Shearing is accomplished by the upper or second shear blade 135 which is loosely supported between pivot pins 97 by grooves 137, 138, shear blade 135 being of such length that it is engaged by the lower end of drive link 74 near the end of the sealing operation to shear the upper or supply end of the strapping adjacent the seal by cooperation with lower or first shear blade 140.

As best seen in FIGS. 1, 2 and 4, lower shear blade 140 is supported at one end thereof on main frame 10 by clamping of the blade to the frame by bar 141. Shear blade 140 is preferably constructed from heavy-gauge spring stock, sheet steel and arranged to be biased downwardly toward the main frame such that tab 142 overlies and is coextensive with projecting tongue 120 and cooperates therewith to separate the overlapped strap portions for the shearing operation. Clamped to the main frame with the same mounting bar 141 is an upper strap gripper 145 also constructed from spring stock and biased toward the main frame to assist the operator during the threading operation wherein the strapping is inserted into the tool.

Having described the general arrangement of this improved tool, it is noted that it is desirable that the tensioning wheel 24 be held in an elevated position during the strap threading to provide ample clearance between the tensioning wheel 24 and cooperating plug 33 to facilitate insertion of both the free end and the supply end of the strapping to provide the overlapped strap portions necessary for sealing. To this end there is provided adjacent the rear edge of main frame 10 a lip or shoulder 136 (see FIGS. 1, 2 and 4) suitably secured to the frame and positioned to be engaged by the hooklike latch member 139 which is pivotally secured to auxiliary frame 12 by pin 123 and support arm 124 and biased toward tensioning wheel 24 by spring 132. As control handle 22 is pushed downwardly to the dotted-line position as seen in FIG. 1, the nose portion of lever 139 is cammed outwardly by the upper surface of shoulder 136 so that the hook portion will engage under the overhanging lip to hold the motor in the lowered position thereby holding the tensioning wheel 24 in the raised position.

It is also desirable that the lower shear blade 140 be held in the elevated or raised position while the free end of the strap is positioned under the sealing head and tensioning wheel and to this end, as best seen in FIGS. 1, 2 and 4, the lower shear blade is apertured at 152 to receive the generally T-shaped link 153 which is pivotally connected to lower strap lever or link 155 by pin 156, link 155 being pivoted to post 35 of main frame 10 by the pin 157. Link 155 extends rearwardly and terminates adjacent the shoulder 136 and is positioned for engagement with cooperating latch member 160 which is also pivotally mounted on auxiliary frame 12 by pin 123 and which is biased toward wheel 24 by spring 161. As auxiliary frame 12 is moved to the dotted-line position of FIG. 1, the lower end of latch member 160 engages the free end of lever 155 to pivot the lever thereby to raise the lower shear blade through engagement of the enlarged end on link 153 with the undersurface of the blade.

In order to achieve simultaneous raising of the sealing head, the tensioning wheel and the lower shear blade when the auxiliary frame is moved downwardly to the dotted-line position of FIG. 1, there is provided, as best seen in FIG. 2, a lever arm 170 which is secured to auxiliary frame 12 and which is positioned to engage the arm 172, best seen in FIG. 4, secured to the sealing head frame 55. As auxiliary frame 12 moves to the dotted-line position, the end of lever 170 raises to engage the lower end of arm 172 thereby pivoting the sealing head about the pin 50 to the raised position to further facilitate the strap-threading operation. For completeness, it is noted that arm 170 engages arm 173 when the auxiliary frame is pivoted downwardly to insure that sealing head 14 is pivoted downwardly, also.

In furtherance of the primary object of this invention to provide true single-station operation of the power-operated strapping tool, there is provided a cam shaft 175 (seen in FIG. 3) which is secured to and forms the rotary axis for the control handle 22. FIGS. 6 and 7 illustrate two portions of a single cam 177 which is secured to the end of cam shaft 175 and rotatable therewith. Portion 178 of cam 177 is provided with a pair of opposed generally circular portions designated A, a pair of first cam rise portions designated B, and a pair of second cam rise portions designated C. These cam portions cooperate with a push rod 180 positioned in an appropriate bore in the motor housing, push rod 180 being biased into engagement with the surface of cam portion 178 by spring 182. As most clearly seen in FIG. 3, the latch members 139 and 160 are arranged such that portion 184 of lever 160 overlies the lever 139 and is positioned to be engaged first by the push rod 180 upon its downward movement under the influence of the rotating cam 177. As cam rise portion B engages the push rod, the push rod is advanced to pivot latch 160 to a non-obstructing position thereby releasing the end of lever 155 to permit the lower shear blade to move toward the main frame under its spring bias. Continued rotary movement of the cam 177 brings cam rise portion C (of greater radial height than portion B) into engagement with the push rod thereby pivoting both latch 160 and latch 139 to release the auxiliary frame for movement under the influence of spring 47 thereby pivoting tensioning wheel 24 about the pivot point 37 toward the main frame. It is noted at this point that the cam 177 contains duplicate portions; that is, the cycle of operation of the push rod is repeated twice for each rotation of the cam.

Energization of the air motor to drive the tensioning wheel and the air motor to drive the sealing head are also controlled by rotation of the control handle 22. Air admitted to inlet port 190 progresses through the valve assembly designated 192 through passageways 193 and 194 to motor control valve 195. The cam portion 196 of cam 177 has a pair of cam rise portions 198 which, when they engage push rod 199, open valve 195 to admit air into the motor to rotate the tensioning wheel. In accordance with accepted practices, the air pressure of the supply will determine the tension applied to the strapping by rotation of the wheel 24 and the motor will stall when the desired tension has been achieved. Continued rotation of handle 22 brings one of the pair of cam rise portions 201 on cam 202 into engagement with push rod 204 to open the check valve 206 to permit valve member 207 of valve 192 to rise due to an unbalance of air pressures exerted on the spool thereby admitting supply air to port 210 which is connected by suitable hose 212 to inlet port 72 on the air motor so as to operate the sealing and shearing mechanism. Continued rotation of the handle to the off or neutral position closes all valves.

As most clearly seen in FIG. 2, the control handle is marked with the numbers 1, 2, 3, 4, 5 and the letter "N" along one half of the periphery thereof, a second set of control positions being provided along the other one half to reduce the movement required for a complete tool cycle. The position 1 corresponds to the point of engagement of cam rise B with push rod 180; position 2 corresponds to the point of engagement of cam rise C with push rod 180; position 3 corresponds to the point of engagement of cam rise 198 with push rod 199; position 4 corresponds to the flat portion of cam 196 which closes the motor valve 195; and position 5 corresponds to the point of engagement of cam rise 201 with rod 204 wherein the sealing head motor is energized. The "N" or neutral position corresponds to the smallest radius of each cam surface and permits the valve spool 207 to return to the position shown in FIG. 3 wherein the air supply to sealing head 14 is closed and air is precluded from energizing the motor 20 by valve 195, the air from sealing head being vented through port 219.

As a safety feature, there is provided, as seen in FIG. 9, a positive lock for the neutral or off position of the control handle 22, such positive lock being a pair of opposed notches in the cam shaft 175 which are engaged by a detent 215 urged into engagement with the notches by the spring-pressed rod 216, the detent being releasable by pushing control arm 218. Such a positive lock insures that the handle can be used to raise the auxiliary frame and the sealing head without inadvertently energizing either of the air motors.

It is also noted for completeness that a one-way ratchet mechanism is provided, as seen in FIG. 8, the ratchet wheel 220 being driven by the motor output shaft, the ratchet lever 221 precluding reverse movement of the motor shaft and therefore reverse movement of the tensioning wheel. This ratchet can be disabled by depressing the operating lever 223.

It is believed that a further understanding of my invention and the objects accomplished thereby can best be gained by observing a complete cycle of operation of this improved strapping tool commencing with the threading of the strapping through the tool. In view of the fact that the strapping operation is concluded with the tensioning wheel 24, sealing head 14, and lower shear blade 140 in the raised position, the tool is ready to receive the free end of the strapping which is placed between the main frame 10 and the lower shear blade in alignment with the tongue 120 and extending across the opening 122 in the main frame. The control handle 22 is then rotated to position 1 to release the latch 160 from the dotted-line position of FIG. 1 thereby permitting lever 155 to pivot and release the lower shear balde 140 for movement downwardly into engagement with the free end of the strap, thereby to exert a restraining force which aids in positioning the free end of the strap under the sealing head. This gripping force exerted by the shear blade 140 is generally sufficient to prevent the free end of the strapping from slipping out of position while the strapping is looped around the package that is to be strapped as seen in FIG. 1. The supply end of the strapping is then passed under the sealing head 14 on top of the free end of the strapping and is inserted between the lower shear blade 140 and the spring lever or upper strap gripper 145 and thereafter passed underneath the tensioning wheel 24. The control handle 22 is then rotated to position 2 to release the main latch 139 and permit spring 47 to pivot the auxiliary frame 12 about pin 36 bringing the tensioning wheel 24 into engagement with the upper surface of the supply end of the strapping and forcing the lower surface of the free end of the strapping into engagement with the serrated plug 33. At the same time, the sealing head 14 moves into position with the sealing and shearing mechanism positioned over the overlapped strap portions. At this time it is noted that the seal feed mechanism 60 has previously placed a seal between the jaws 96. Rotation of the control lever 22 to position 3 energizes the air motor to move the supply end of the strapping relative to the free end of the strapping thereby tensioning the strapping about the package to the desired tension as determined by the air supply pressure at which time the air motor 20 stalls and the tensioning wheel 24 stops. Rotation of the control handle 22 to position 4 shuts off the air supply to the motor thereby permitting the operator to stop the strapping operation for such reason as he may desire before the seal is applied. For example, movement of the handle back and forth between positions 3 and 4 permits "jogging" of the tensioning wheel to apply a strap tension other than that determined by the supply air pressure. If such action is not desired, the handle 22 is immediately rotated to position 5 to admit air to the sealing cylinder 62 and drive the operating link 74 downwardly to bring the latching jaws 125 and 126 into position beneath the tongue 120 in the main frame 10, to wrap the sealing jaws 96 around the seal and overlapped strap portions thereby forming the seal thereon, to drive the punch 108 downwardly to partially sever opposed edges of the seal and overlapped strapped portions, and to drive the upper shear blade 135 downwardly relative to the lower shear blade 140 thereby severing the supply end of the strap from the loop immediately adjacent the seal. In control handle position 5 the supply of air to the tensioning motor is cut off and tensioning-wheel position (strap tension) is held by the ratchet mechanisms 220, 223. The control handle 22 has then rotated to the neutral position, in which position it is automatically latched by lever 215 thereby cutting off the air supply to the sealing mechanism 14 and venting the air in cylinder 56 through port 219. At this time, the main frame 10 is held securely to the package by the tensioned strap thereby permitting the operator merely to force the handle 22 downwardly to pivot the auxiliary frame 12 about the pivot point thereby to raise the tensioning wheel 24 and the sealing head 14. At this time, a lateral movement of the handle 22 will cause the main frame 10 to slide out from underneath the strapping with the tool prepared for a subsequent strapping operation.

From the foregoing description of the structure and operation of this improved tool, it is believed apparent that true "single-control-position" operation has been obtained for a portable power-operated strapping tool. This single control position permits the operator to be unskilled and unfamiliar with regard to strapping operations since all that is required is a very simple strap-threading operation followed by foolproof sequential operation of a single control handle to complete the entire tensioning, sealing, and severing operation as well as permitting the same handle to be utilized to raise the sealing head and auxiliary frame at the conclusion of the tensioning operation and to strip the tool from the completed strap loop. It is also to be noted that the tensioning and sealing portions of this improved tool have separate utility. For example, the sealing head of this invention provides an extremely desirable operating feature which locks the sealing head relative to its frame to insure that the supply end of the strap is severed without any deformation, bending or other damage to the strapping which will tend to severely weaken the resultant joint or the strap loop. In addition, it is noted that the tensioning mechanism included in the auxiliary frame provides an extremely rugged device which can be automatically operated from a single control position including the operations of raising and lowering the tensioning wheel. The resultant durability of this strapping tool combination minimizes the necessity for repair and maintenance while insuring that a properly tensioned loop will be formed with each strapping operation.

As will be apparent to persons skilled in the art, various modifications and adaptations of the structure above described will become readily apparent without departure from the spirit and scope of the invention, the scope of which is defined in the appended claims.

I claim:

1. A tool for tensioning and sealing the overlapping ends of a loop of strap comprising a main frame over which the strap is passed, a tensioning wheel, an auxiliary frame mounting said tensioning wheel for movement toward and away from said main frame, a first latch operable between said main frame and said auxiliary frame for holding said tensioning wheel in a raised position away from said main frame, a first shear blade mounted on said main frame for movement toward and away from said main frame, a control lever pivotally mounted on said main frame for raising said shear blade, a second latch operable between said control lever and said auxiliary frame for holding said first shear blade in the raised position when said tensioning wheel is in its raised position, means on said auxiliary frame for selectively releasing the latches to permit movement of the first shear blade and tensioning wheel toward said main frame, a sealing head mounted on said main frame for movement toward and away from said main frame and including a second shear blade positioned to cooperate with said first shear blade to sever the supply end of the strap from the loop, and a motion transmitting connection between said auxiliary frame and said sealing head for raising said sealing head when said tensioning wheel is raised.

2. The tool as set forth in claim 1 wherein said sealing head is provided with means engageable with said main frame to lock said sealing head relative to said main frame prior to actuation of said second shear blade.

3. The tool as set forth in claim 1 wherein an aperture is provided in said main frame opposite said sealing head and a tongue on said main frame extends into said aperture, wherein said first shear blade overlies said tongue and is coextensive therewith, and wherein said sealing head includes a pair of latching jaws which engage said tongue prior to actuation of said second shear blade.

4. A tool for tensioning and sealing the overlapping ends of a loop of strap comprising a main frame over which the strap is passed, a tensioning wheel including a motor drive therefor, an auxiliary frame mounting said wheel and motor drive for movement toward and away from said main frame, a first latch operable between said main frame and said auxiliary frame for holding said wheel in a raised position away from said main frame, a first shear blade mounted on said frame for movement toward and away from said main frame, a control lever pivotally mounted on said main frame for raising said shear blade, a second latch operable between said control lever and said auxiliary frame for holding said first shear blade in the raised position when said tensioning wheel is in its raised position, a sealing head including motor drive means mounted on said main frame for movement toward and away from said main frame and including a second shear blade positioned to cooperate with said first shear blade to sever the supply end of the strap from the loop, a motion transmitting connection between said auxiliary frame and said sealing head for raising said sealing head when said tensioning wheel is raised, and a single control on said auxiliary frame for selectively releasing the latches and energizing the motor drives for the tensioning wheel and sealing head.

5. The tensioning and sealing tool as defined in claim 4 wherein the single control comprises a handle mounted on said auxiliary frame for rotation about an axis extending transversely of the direction in which said strapping is passed over the main frame, said handle being rotatable to sequentially release the latches and energize the motors and forming the handle which, when depressed toward the main frame, simultaneously raises the auxiliary frame and the sealing head.

6. The tensioning and sealing tool as set forth in claim 1 wherein said second latch is engageable with said control lever to raise said first shear blade when said tensioning wheel is raised.

7. The tool for tensioning and sealing strap as set forth in claim 5 wherein a cam is provided for actuating each of the latches and for controlling the operation of the tensioning wheel motor and the sealing head motor, each said cam being mounted for simultaneous rotation with the control handle and being contoured to provide sequential release of said second latch release of said first latch, energization of said tensioning wheel motor, and energization of said sealing head motor.

8. A portable tool for tensioning a loop of strapping and joining the overlapped portion of the loop comprising a main frame over which the overlapped portion of the strapping passes, an auxiliary frame including a tensioning wheel, means mounting said auxiliary frame on said main frame for pivotal movement relative thereto to raise and lower said tensioning wheel relative to the main frame and the overlapped strap portion, a latch operable between said main frame and said auxiliary frame to hold said tensioning wheel in the raised position, a sealing head pivotally mounted on said main frame for movement toward and away from the overlapped strap portions and connected to said auxiliary frame for simultaneous movement therewith away from said main frame, and control means positioned on the opposite side of the pivot point of said auxiliary frame from said tensioning wheel for releasing said latch and forming a handle which, when depressed toward the main frame, raises said tensioning wheel and said sealing head.

9. A portable tool as set forth in claim 8 wherein a first shear blade is mounted on said main frame for movement toward and away from said main frame, a second shear blade is mounted on said sealing head for cooperation with said first shear blade to sever the supply end of the strapping from the loop, a control lever is pivotally mounted on said main frame for raising said first shear blade, a second latch is operable between said control lever and said auxiliary frame for holding said shear blade in a raised position when said tensioning wheel is in a raised position, and said control means on said auxiliary frame is operable to selectively release said first latch and said second latch.

10. The portable tool as set forth in claim 9 wherein said second latch is engageable with said control lever to raise said first shear blade when said tensioning wheel is raised.

11. A portable power-operated tool for tensioning a loop of strapping, joining the overlapped portions of the loop and severing the supply end of the strapping from the loop comprising a main frame over which the overlapped portions of the strapping passes, an auxiliary frame including a tensioning wheel and motor drive means therefor, means mounting said auxiliary frame on said main frame for pivotal movement about a point adjacent one end of the main frame to raise and lower said tensioning wheel relative to the main frame and the overlapped strap portions, a first latch operable between said main frame and said auxiliary frame to hold said tensioning wheel in the raised position, a first shear blade mounted on said main frame for movement toward and away from said main frame, a control lever pivotally mounted on said main frame for raising said shear blade, a second latch operable between said control lever and said auxiliary frame for holding said shear blade in the raised position when said wheel is in its raised position, a sealing head including a second shear blade mounted for cooperation with said first shear blade and motor drive means therefor, means pivotally mounting said sealing head on said main frame for movement toward and away from the overlapped strapped portions, said sealing head being connected to said auxiliary frame for simultaneous movement therewith away from said main frame, and control means on said auxiliary frame positioned on the opposite side of the pivot from said tensioning wheel for sequentially releasing the first and second latches and energizing the tensioning wheel motor and sealing head motor, said control means forming a handle which, when depressed toward said main frame, raises said wheel and said sealing head.

12. A portable power-operated tool as set forth in claim 11 wherein said handle is mounted for rotation about an axis transverse to the direction in which the strap passes over said main frame and wherein a plurality of cams are coaxially positioned on a shaft for rotation simultaneously with said control handle for effecting the desired sequence of energization and de-energization of the motors and release of the latches.

13. A portable tool for tensioning a loop of strapping, joining the overlapped portion of the loop and severing the supply end of the strapping from the loop comprising a main frame over which the overlapped portion of the strapping passes and including an aperture disposed beneath the overlapped strap portion, an auxiliary frame including a tensioning wheel, means mounting said auxiliary frame on said main frame for pivotal movement relative thereto to raise and lower said tensioning wheel relative to the overlapped strap portion, a first latch operable between said main frame and said auxiliary frame to hold said tensioning wheel in the raised position, a tongue on the main frame extending into the aperture therein, a first shear blade mounted on said main frame for movement toward and away from said main frame, said first shear blade being coextensive with said tongue when positioned adjacent thereto, a control lever pivotally mounted on said main frame for raising said first shear blade, a second latch operable between said control lever and said auxiliary frame to hold said first shear blade in a raised position when said tensioning wheel is in a raised position, a sealing head pivotally mounted on said main frame for movement to a position of registry with the aperture therein, said sealing head including a second shear blade for cooperation with said first shear blade to sever the strap and a pair of latching jaws engageable with said tongue prior to actuation of said second shear blade, means connecting said sealing head to said auxiliary frame for movement therewith away from the main frame, and control means positioned on the opposite side of the auxiliary frame pivot point from the tensioning wheel for releasing the latches and forming a handle, which when depressed toward said main frame, raises the tensioning wheel and sealing head.

14. A tool for joining the overlapped portion of a loop of strapping and severing the supply end of the strapping from the loop comprising a main frame, a sealing head pivotally mounted on said main frame and including a second shear blade, a first shear blade mounted on said main frame for cooperation with said second shear blade, means for actuating said sealing head to join the overlapped loop portion and to thereafter actuate the second shear blade to sever the strapping, and means on said sealing head engageable with said frame to lock the head relative thereto prior to actuation of said second shear blade.

15. The tool as set forth in claim 14 wherein an aperture is provided in said main frame opposite said sealing head and a tongue on said main frame extends into said aperture, wherein said second shear blade overlies said tongue and is coextensive therewith, and wherein said means on said sealing head includes a pair of latching jaws which engage said tongue prior to actuation of said second shear blade.

References Cited by the Examiner
UNITED STATES PATENTS

| | | | |
|---|---|---|---|
| 1,778,530 | 10/30 | Kool et al. | |
| 2,072,566 | 3/37 | Perrelet | 140—123.6 XR |
| 2,866,954 | 12/58 | Johnson et al. | 74—471 XR |
| 3,032,075 | 5/62 | Hall et al. | 140—93.4 |

CHARLES W. LANHAM, *Primary Examiner.*

WILLIAM F. PURDY, *Examiner.*